US008051316B2

(12) United States Patent
Roberts et al.

(10) Patent No.: US 8,051,316 B2
(45) Date of Patent: Nov. 1, 2011

(54) SYSTEM AND METHOD FOR MANAGING POWER SUPPLY UNITS

(75) Inventors: Michael J. Roberts, Austin, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 729 days.

(21) Appl. No.: 12/135,323

(22) Filed: Jun. 9, 2008

(65) Prior Publication Data

US 2009/0307514 A1    Dec. 10, 2009

(51) Int. Cl.
*G06F 1/00* (2006.01)
*G06F 11/30* (2006.01)
*G06F 11/00* (2006.01)
*G06F 1/26* (2006.01)
*G06F 1/32* (2006.01)

(52) U.S. Cl. ........ 713/330; 713/300; 713/324; 713/340; 713/320; 714/14

(58) Field of Classification Search .................. 713/340, 713/320, 300, 330, 324; 714/14
See application file for complete search history.

(56) References Cited

U.S. PATENT DOCUMENTS

| | | | | |
|---|---|---|---|---|
| 5,842,027 A * | 11/1998 | Oprescu et al. | ............... | 713/300 |
| 6,618,811 B1 * | 9/2003 | Berthaud et al. | ............... | 713/300 |
| 6,785,827 B2 * | 8/2004 | Layton et al. | ................. | 713/300 |
| 7,840,824 B2 * | 11/2010 | Baba et al. | ..................... | 713/300 |
| 2004/0163001 A1 * | 8/2004 | Bodas | ........................... | 713/300 |

OTHER PUBLICATIONS

DC-14845, "Systems and Methods for Power Supply Wear Leveling in a Blade Server Chassis", Shetty et al., 31 pages. Dec. 20, 2007.

\* cited by examiner

*Primary Examiner* — Thomas Lee
*Assistant Examiner* — Samantha Hoang
(74) *Attorney, Agent, or Firm* — Baker Botts L.L.P.

(57) ABSTRACT

Systems and methods for power management in an information handling system are disclosed. A method may include determining a power requirement of resources configured to receive power from a plurality of power supply units including one or more online power supply units, one or more redundant power supply units, and one or more standby power supply units. The method may also include determining a power capacity of the one or more online power supply units. The method may additionally include determining if the power capacity of the one or more online power supply units exceeds the power requirement of the resources. The method may further include transitioning at least one of the power supply units based on such determining steps.

17 Claims, 3 Drawing Sheets

SYSTEM AND METHOD FOR MANAGING POWER SUPPLY UNITS

TECHNICAL FIELD

The present disclosure relates in general to power management, and more particularly to a system and method for managing power supply units.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the advent of power-hungry information handling systems, power management has become more important. In the past, power conservation has often been a secondary consideration to speed and processor availability. However, due to the increased processing demands required by modern information handling systems, more information handling systems utilize multi-processor systems and/or multiple-blade systems that require more power to operate than single-processor computer systems. In addition, as processor designs continue to scale up in speed and density, corresponding power consumption can increase dramatically, requiring more efficient power management.

While processing demands and device consumption are often driving factors in the desire for managing and conserving power, other factors such as network failures, blackouts, and other device, system, or mechanical failures may also motivate a desire to reduce and efficiently manage power consumption. Current solutions often employ a power source management, sequencing, and conservation technique to handle inrush and steady state load demands, as well as redundancy and efficiency requirements of power sources.

In addition, in certain applications (e.g., Internet servers), multiple redundant power supplies are often employed to reduce or eliminate downtime in the event of a power supply failure. In many redundant power supply systems, all available power supplies are generally brought online and share the power requirements of the system. However, in many instances, each power supply may become more efficient as the power delivered from it increases. Thus, if many redundant power supplies are online and sharing a relatively small load, the individual redundant power supplies may be operating relatively inefficiently.

SUMMARY

In accordance with the teachings of the present disclosure, disadvantages and problems associated with power management in an information handling system chassis have been substantially reduced or eliminated.

In accordance with one embodiment of the present disclosure, a method for managing power supply units is provided. The method may include determining a power requirement of resources configured to receive power from a plurality of power supply units including one or more online power supply units, one or more redundant power supply units, and one or more standby power supply units. The method may also include determining a power capacity of the one or more online power supply units. The method may additionally include determining if the power capacity of the one or more online power supply units exceeds the power requirement of the resources. The method may further include transitioning at least one of the power supply units. Transitioning of at least one of the power supply units may include at least one of: (i) transitioning at least one of the one or more online power supply units to a standby power supply unit in response to a determination that the power capacity of the one or more online power supply units exceeds the determined power requirement of the resources; and (ii) transitioning at least one of the one or more standby power supply units to an online power supply unit in response to a determination that the power requirement of the resources exceeds the determined power capacity of the one or more online power supply units.

In accordance with another embodiment of the present disclosure, a system for managing power supply units may include a plurality of power supply units configured to provide electrical power to one or more resources and a management controller communicatively coupled to the power supply units. The plurality of power supply units may include one or more online power supply units, one or more redundant power supply units, and one or more standby power supply units. The management controller may be configured to: (a) determine a power requirement of resources powered from the plurality of power supply units; (b) determine a power capacity of the one or more online power supply units; (c) determine if the power capacity of the one or more online power supply units exceeds the power requirement of the resources; and (d) transition at least one of the power supply units. The transition may includes at least one of (i) a transition of at least one of the one or more online power supply units to a standby power supply unit in response to a determination that the power capacity of the one or more online power supply units exceeds the determined power requirement of the resources; and (ii) a transition of at least one of the one or more standby power supply units to an online power supply unit in response to a determination that the power requirement of the resources exceeds the determined power capacity of the one or more online power supply units.

In accordance with a further embodiment of the present disclosure, an information handling system may include resources, a plurality of power supply units configured to provide electrical power to the resources, and a management controller communicatively coupled to the power supply units and the resources. The resources may include a processor and a memory communicatively coupled to the processor. The plurality of power supply units may include one or more online power supply units, one or more redundant power supply units, and one or more standby power supply units. The management controller may be configured to: (a) determine a power requirement of the resources; (b) determine a power capacity of the one or more online power supply units; (c) determine if the power capacity of the one or more online power supply units exceeds the power requirement of the resources; and (d) transition at least one of the power supply units. The transition may includes at least one of: (i) a transition of at least one of the one or more online power supply units to a standby power supply unit in response to a determination that the power capacity of the one or more online power supply units exceeds the determined power requirement of the resources; and (ii) a transition of at least one of the one or more standby power supply units to an online power supply unit in response to a determination that the power requirement of the resources exceeds the determined power capacity of the one or more online power supply units.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
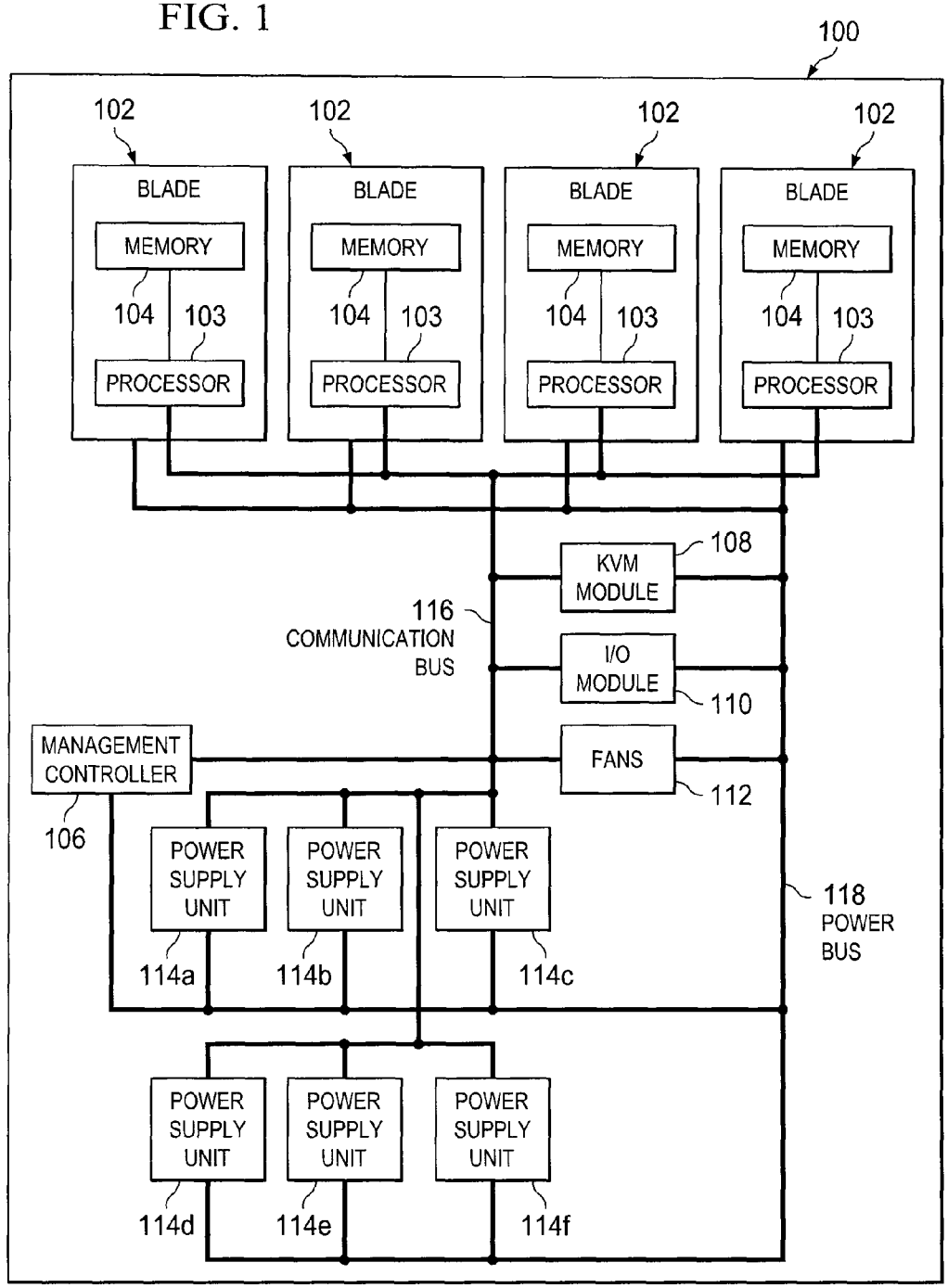
FIG. 1 illustrates a block diagram of an example information handling system chassis, in accordance with certain embodiments of the present disclosure.
Figure 2:
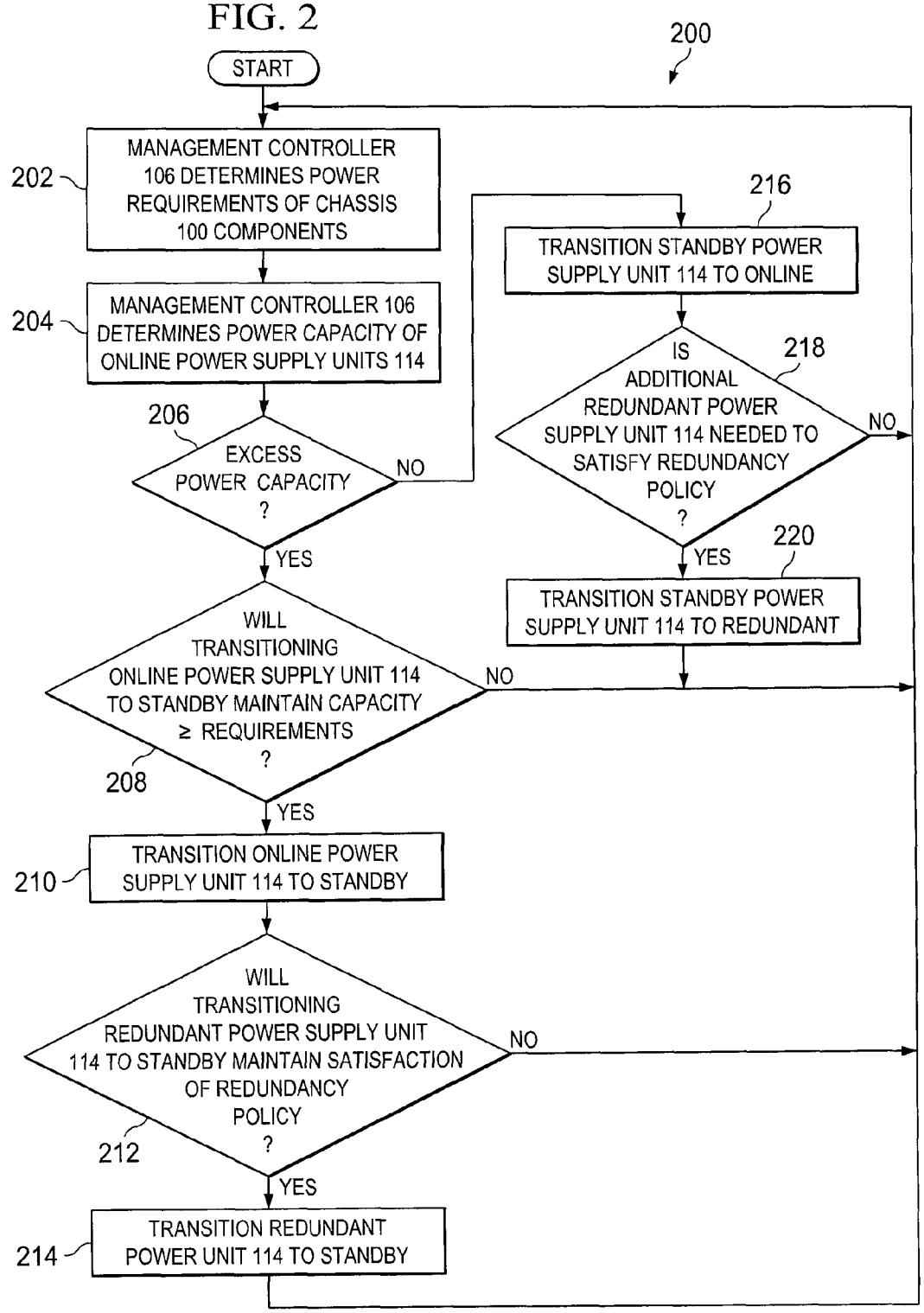
FIG. 2 illustrates a flow chart of an example method for managing power supply units, in accordance with certain embodiments of the present disclosure.
Figure 3:
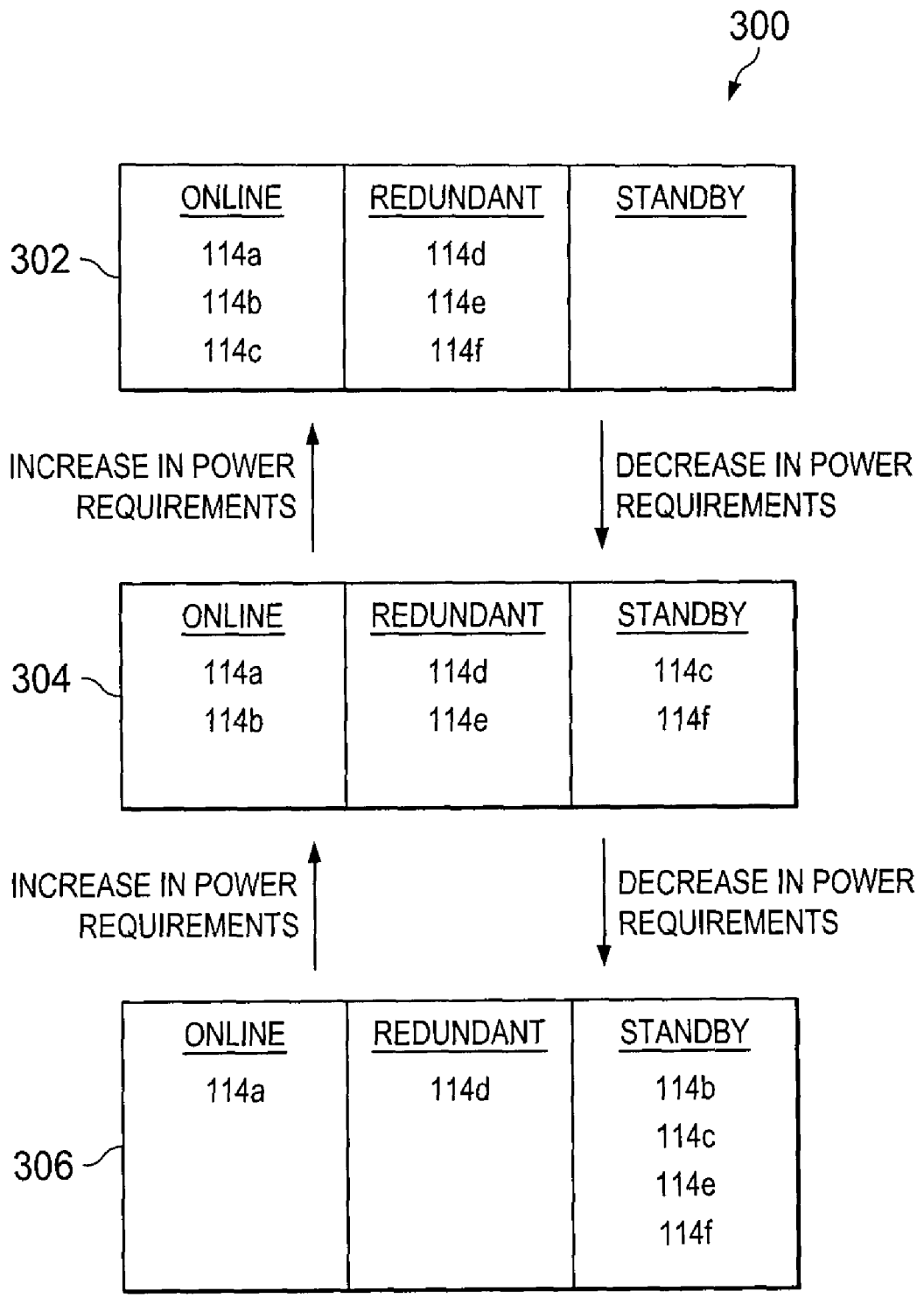
FIG. 3 illustrates a flow chart of an example state diagram illustrating the transitioning of power supply units among online, redundant, and standby states, in accordance with certain embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers; and/or any combination of the foregoing.

FIG. 1 illustrates a block diagram of an example information handling system chassis 100 (referred to herein as "chassis 100"), in accordance with certain embodiments of the present disclosure. Chassis 100 may be an enclosure that serves as a container for various information handling components, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of server blades and/or other components (e.g., a "rack mount" system). As depicted in FIG. 1, chassis 100 may include blades 102, one or more management controllers 106, one or more keyboard-mouse-video (KVM) modules 108, one or more input-output (I/O) modules 110, one or more fans 112, power supply units 114, a communication bus 116, and one or more power bus 118. As used herein, blades 102, management controllers 106, KVM module 108, I/O modules 110, fans 112, and any other components powered by power supply units 114 may be referred to herein collectively as "resources" and individually as a "resource."

Each blade 102 may comprise an information handling system. In certain embodiments, one or more blades 102 may be a server (e.g., a blade server). In such embodiments, each blade 102 may be mounted in a suitable slot and/or interface of chassis 100. As depicted in FIG. 1, each of blades 102 may include a processor 103 and a memory 104. Although FIG. 1 depicts chassis 100 having four blades 102, chassis 100 may have any suitable number of blades 102.

Each processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 103 may interpret and/or execute program instructions and/or process data stored in its associated memory 104 and/or another component of chassis 100. Although FIG. 1 depicts that each blade 102 comprises a single processor 103, one or more blades 102 may include any suitable number of processors 103.

Each memory 104 may be communicatively coupled to an associated processor 103 and may comprise any system, device, or apparatus operable to retain program instructions or data for a period of time. Each memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated blade 102 and/or chassis 100 is turned off. Although FIG. 1 depicts memory 104 as a component integral to blade 102, one or more memories 104 may reside external to blade 102.

Management controller 106 may be communicatively coupled to components of chassis 100, may be electrically coupled to power supply units 114a-f, and/or may include any system, device or apparatus operable to monitor the power requirements of and control the operation of components of chassis 100. Management controller 106 may include any hardware, firmware, and/or software for determining the productivity of individual power supply units 114a-f as well as the productivity of various combinations of power supply units 114a-f (e.g., in a load sharing configuration). In addition, in some embodiments, management controller 106 may be operable to determine the power requirements of the various components of chassis 100.

In some embodiments, management controller 106 may manage power supply units 114 such that power supply units 114 provide the power required by the various components of chassis 100 (e.g., by bringing appropriate power supply units 114 online or offline, and/or controlling the power delivered by each of the power supply units 114). In these and other embodiments, management controller 106 may control the status of each power supply unit 114 (e.g., whether such power supply unit 114 is online, redundant, or in a standby mode, as described in greater detail below).

KVM module 108 may include any system, device, or apparatus configured to allow a user to control one or more of blades 102 and/or other components of chassis 100 from a single keyboard, video monitor, and/or mouse. In some embodiments, KVM module 108 may include a "local remote" KVM device that allows users to control components of a chassis within approximately 1000 feet of the associated keyboard, video monitor, and/or mouse. In other embodiments, KVM module 108 may include a "KVM over Internet Protocol (IP)" device allowing control signals to be packetized and communicated over a network link (e.g., an Ethernet link).

I/O module 110 may include any system, device or apparatus configured to allow communication between a processor 102 and devices and/or components external to chassis 100 (e.g., storage resources, printers, and/or other peripherals). I/O module 110 may facilitate communication via memory-mapped I/O, port-mapped I/O, interrupts, and/or other suitable mechanism.

Fans 112 may include one or more mechanical or electromechanical fans used for cooling purposes. In certain embodiments, fans 112 may draw cool air into chassis 100 from the outside, expel warm air from inside chassis 100, and/or move air across a heatsink to cool one or more particular components of chassis 100.

Each of power supply units 114a-f may include any device, system, or apparatus operable to supply power or electrical energy to one or more components of chassis 100. For example, one or more power supply units 114a-f may include any system, device, and/or apparatus operable to supply direct current (DC) electrical power to one or more components of chassis 100. DC power sources may include a battery and/or an AC/DC adapter that may convert 120- or 240-volt (or any other suitable voltage) alternating current supplied by a utility company to a regulated lower voltage DC power source. In addition, an AC/DC adapter may also charge a battery while supplying power to chassis 100.

In addition or alternatively, one or more power supply units 114a-f may include any system, device, and/or apparatus operable to supply AC electrical power directly to one or more components of chassis 100. In some embodiments, the delivered AC power may subsequently be converted into a DC power source (e.g., using an AC/DC converter).

In some embodiments, one or more of power supply units 114a-f may include uninterruptible power sources and/or switch mode power sources internal to/or externally coupled to chassis 100. In some embodiments, power supply units 114a-f may be assembled in a redundant configuration within chassis 100 (e.g., one or more power sources may be configured to share a load current such that failure of a single power source may not substantially affect the load current).

Each of power supply units 114a-f may individually be referred to herein as "power supply unit 114." In addition, any plurality of power supply units 114a-f may be collectively referred to herein as "power supply units 114."

Communication bus 116 may include any device, system or apparatus configured to transmit data and/or signals between the various components of chassis 100. For example, communication bus 116 may allow management controller 106 to communication with blades 102, KVM module 108, I/O module 110, fans 112, and/or power supply units 114. Communication bus 116 may include any suitable topology (e.g., parallel, bit-serial, multidrop, daisy chain, coupled via switched hubs, etc.).

Power bus 118 may include any device, system or apparatus configured to deliver electrical current from power supply units 114 to other components of chassis 100 (e.g., blades 102, management controller 106, KVM module 108, I/O module 110, fans 112).

In operation, management controller 106 may monitor and/or compute the power requirements of various components of chassis 100 (e.g., based on the number and types of blades 102, KVM modules 108, I/O modules 110, fans 112, and/or other components of chassis 100). Management controller 106 may also monitor and/or compute the power capacity of power supply units 114 to determine the amount of any excess power capacity (e.g., the power capacity of power supply units 114 less the power requirements of the components of chassis 100). Based on the determination of excess power and the redundancy policy for chassis 100 (redundancy policies are described in greater detail below), management controller 106 may transition the state (e.g., online, redundant and/or standby) of one or more power supply units 114 in order to provide for efficient use of power supply units 114 while also maintaining power supply redundancy, as described in greater detail below.

As a specific example, for a particular power requirement of chassis 100, management controller 106 may determine that the power capacity of two power supply units 114 is sufficient to provide the power requirements. Accordingly, management controller 106 may set two power supply units 114 to a state of "online." A state of "online" indicates that a power supply unit 114 is powered on and is supplying power to components of chassis 100.

Continuing this example, management controller 106 may also determine the additional power supply units 114 that should be powered on to satisfy the redundancy policy established for chassis 100, and set these power supply units 114 to a state of "redundant." A state of "redundant" indicates that a power supply unit 114 is on and is serving as a redundant power supply unit 114. In some embodiments, a redundant power supply unit 114 will share the power requirement load of chassis 100 with online power supplies 114. The redundancy policy established for chassis 100 may define the extent of power supply unit redundancy to be maintained within chassis 100. For example, chassis 100 may have an "N+1" redundancy policy, in which only one power supply 114 is designated as redundant. Alternatively, chassis 100 may have an "N+N" or fully-redundant redundancy policy, in which the power supply capacity of redundant power supply units 114 equals the power supply capacity of online power supply units 114. In addition, chassis 100 may employ any suitable redundancy policy ranging between "N+1" and "N+N."

Again continuing with this example, management controller may designate power supply units 114 other than online power supply units 114 and redundant power supply units 114 as "standby." A state of "standby" may indicate that a particular power supply unit 114 is powered off or powered down to a low-power state. Accordingly, chassis 100 may operate with the minimum number of power supply units 114 needed to supply power requirements and satisfy the chassis redundancy policy, while other power supply units 114 may be powered down. The online and redundant power supplies 114 may be expected to run at the highest usage levels possible given power requirements and the redundancy policy, thereby potentially increasing the efficiency of the online and redundant units, as well as the aggregate of the power supply units 114.

FIG. 2 illustrates a flow chart of an example method 200 for managing power supply units, in accordance with certain embodiments of the present disclosure. According to one embodiment, method 200 preferably begins at step 202. As noted above, teachings of the present disclosure may be implemented in a variety of configurations of chassis 100. As such, the preferred initialization point for method 200 and the order of the steps 202-220 comprising method 200 may depend on the implementation chosen.

At step 202, management controller 106 may monitor the various components of chassis 100 (e.g., via communication bus 116) to determine power requirements of chassis 100. While the power requirements of chassis 100 may remain substantially steady during operation, any number of events may significantly change the power requirements. For example, the power requirements of chassis 100 may significantly increase in the event a blade 102, KVM module 108, I/O module 110, fan 112, and/or other component is inserted into chassis 100 and/or powered up. On the other hand, the power requirements of chassis 100 may significantly decrease in the event a blade 102, KVM module 108, I/O module 110, fan 112, and/or other component is removed from chassis 100 and/or powered down.

At step 204, management controller 106 may determine the power capacity of online power supply units 114 designated as "online." For example, management controller 106 may access a table or other data structure to determine which power supply units 114 are online and/or the individual power capacities of each online power supply unit 114. In some embodiments, each individual power supply unit 114 may communicate to management controller 106 whether such power supply unit 114 is online and/or its individual power capacity.

At step 206, management controller 106 may compare the power capacity of online power supply units 114 to the power requirements of chassis 100 to determine if excess power capacity exists with respect to the online power supply units 114 (e.g., whether the power capacity of online power supply units 114 exceeds the power requirements of chassis 100). If excess power capacity is present, method 200 may proceed to step 208. Otherwise, if excess power capacity is not present, method 200 may proceed to step 216.

At step 208, management controller 106 may determine whether transitioning one or more of the online power supply units 114 to standby will allow the power capacity of the remaining online power supply units 114 to remain in excess of the power requirements of chassis 100. If the power capacity of the remaining online power supply units 114 will remain in excess of the power requirements of chassis 100, method 200 may proceed to step 210. Otherwise, if the power capacity of the remaining online power supply units 114 will not remain in excess of the power requirements of chassis 100, method 200 may return to step 202.

At step 210, in response to the determination that transitioning one or more online power supply units 114 to standby will allow the power capacity of remaining online power supply units 114 to provide power capacity in excess of the power requirements of chassis 100, management controller 106 may transition one or more online power supply units 114 to standby.

At step 212, management controller 106 may determine whether transitioning one or more power supply units 114 designated as redundant to standby will allow the redundancy policy of chassis 100 to remain satisfied. If transitioning one or more redundant power supply units 114 to standby will allow the redundancy policy of chassis 100 to remain satisfied, method 200 may proceed to step 214. Otherwise, if transitioning one or more redundant power supply units 114 to standby will not allow the redundancy policy of chassis 100 to remain satisfied, method 200 may return to step 202.

At step 214, in response to the determination that transitioning one or more redundant power supply units 114 to standby will allow the redundancy policy of chassis 100 to remain satisfied, management controller 106 may transition one or more redundant power supply units 114 to standby. After completion of step 214, method 200 may proceed again to step 202.

At step 216, in response to the determination that the online power supply units 114 do not have power capacity in excess of the power requirements of chassis 100, management controller 106 may transition one or more standby power supply units 114 to online.

At step 218, management controller 116 may determine whether one or more additional redundant power supply units 114 are needed to satisfy the redundancy policy of chassis 100. If additional redundant power supplies 114 are needed, method 200 may proceed to step 220. Otherwise, if additional redundant power supplies 114 are not needed, method 200 may proceed to step 202.

At step 220, in response to the determination that additional redundant power supply units 114 are needed to satisfy the redundancy policy of chassis 100, management controller 106 may transition one or more standby power supply units 114 to redundant. After completion of step 220, method 200 may proceed again to step 202.

Although FIG. 2 discloses a particular number of steps to be taken with respect to method 200, it is understood that method 200 may be executed with greater or fewer steps than those depicted in FIG. 2. In addition, although FIG. 2 discloses a certain order of steps to be taken with respect to method 200, the steps comprising method 200 may be completed in any suitable order. For example, in certain embodiments, step 202 may executed before, after, or substantially contemporaneous with step 204. Method 200 may be implemented using system 100 or any other system operable to implement method 200. In certain embodiments, method 200 may be implemented partially or fully in software and/or firmware embodied in tangible computer-readable media.

FIG. 3 illustrates a flow chart of an example state diagram illustrating the transitioning of power supply units 114 among online, redundant, and standby states, in a chassis 100 with an "N+N" or fully redundant redundancy policy, in accordance with certain embodiments of the present disclosure. For the purposes of illustration, state transitions from state 304 will be discussed.

As shown in example state 304, power supply units 114a and 114b are online, power supply units 114d and 114e are redundant, and power supply units 114c and 114f are standby. In the event of an increase in power requirements of the components of chassis 100 (e.g., a blade 102, KVM module 108, I/O module 110, fan 112, and/or other component is inserted into chassis 100 and/or powered up), management controller 106 may determine that the power requirements of chassis 100 exceed the power capacity of online power supply units 114a and 114b. Accordingly, management controller 106 may transition standby power supply unit 114c to online, as shown in state 302. If an "N+N" or fully redundant redundancy policy is in place in chassis 100, management controller 106 may also determine that an additional power supply unit 114 is needed to satisfy the redundancy policy, and may transition standby power supply unit 114f to online, also as shown in state 302.

On the other hand, in the event of a decrease in power requirements of the components of chassis 100 (e.g., a blade 102, KVM module 108, I/O module 110, fan 112, and/or other component is removed from chassis 100 and/or powered down), management controller 106 may determine that the power capacity of online power supply units 114a and 114b exceeds the power requirements of chassis 100. Accordingly, management controller 106 may transition online power supply unit 114b to standby, as shown in state 306. If an "N+N" or fully redundant redundancy policy is in place in chassis 100, management controller 106 may also determine that a redundant power supply unit 114d or 114e may be transitioned to standby and still satisfy the redundancy policy. In this example, management controller transitions redundant power supply unit 114e to standby, also as shown in state 306.

Although the foregoing discussion has been directed towards a redundant power supply unit arrangement in a single chassis 100 for the purposes of clarity, approaches identical or similar to the systems and methods described above may be applied to a redundant power supply arrangement that supplies power to multiple chasses.

Using the methods and systems disclosed herein, problems associated conventional approaches to managing power consumption in an information handling system chassis have been reduced or eliminated. For example, because the methods and systems disclosed may allow for power supply units to be transitioned to and from a standby state based on power demands, the usage of active power supply units may be maximized, and the power efficiency of the power supply units may be increased. In addition, standby power supply units may be kept powered-off or powered-down, the wear and tear of power supply units may be reduced and/or the mean time between failure of the power supply units (and the aggregate of the power supply units) may be increased.

Although the present disclosure has been described in detail, it should be understood that various changes, substitutions, and alterations can be made hereto without departing from the spirit and the scope of the invention as defined by the appended claims.

What is claimed is:

1. A method for managing power supply units comprising:
determining a power requirement of resources configured to receive power from a plurality of power supply units including one or more online power supply units, one or more redundant power supply units, and one or more standby power supply units;
determining a power capacity of the one or more online power supply units;
determining if the power capacity of the one or more online power supply units exceeds the power requirement of the resources;
transitioning at least one of the power supply units, wherein the transitioning includes at least one of:
transitioning at least one of the one or more online power supply units to a standby power supply unit in response to a determination that the power capacity of the one or more online power supply units exceeds the determined power requirement of the resources; and
transitioning at least one of the one or more standby power supply units to an online power supply unit in response to a determination that the power requirement of the resources exceeds the determined power capacity of the one or more online power supply units;
determining if a redundancy policy for the plurality of power supply units will be satisfied in the event that at least one of the redundant power supply units is transitioned to a standby power supply unit; and
transitioning at least one of the one or more redundant power supply units to a standby power supply unit in response to a determination that the redundancy policy for the plurality of power supply units will be satisfied in the event that the at least one of the redundant power supply units is transitioned to a standby power supply unit.

2. A method according to claim 1, further comprising:
determining if a power capacity of the remaining online power supply units will exceed the power requirements of the resources in the event that at least one of the online power supply units is transitioned to a standby power supply unit; and
transitioning at least one of the one or more online power supply units to a standby power supply unit in response to a determination that the power capacity of the remaining online power supply units will exceed the determined power requirements of the resources in the event that the at least one of the online power supply units is transitioned to a standby power supply unit.

3. A method according to claim 1, wherein the redundancy policy is selected from the group consisting of N+N redundancy and N+1 redundancy.

4. A method according to claim 1, further comprising:
determining if one or more additional redundant power supply units are needed to satisfy a redundancy policy for the plurality of power supply units; and
transitioning at least one of the one or more standby power supply units to a redundant power supply unit in response to a determination one or more additional redundant power supply units are needed to satisfy a redundancy policy for the plurality of power supply units.

5. A method according to claim 4, wherein the redundancy policy is selected from the group consisting of N+N redundancy and N+1 redundancy.

6. A method according to claim 1, wherein the resources and the plurality of power supply units are integral to a chassis.

7. A system for managing power supply units comprising:
a plurality of power supply units configured to provide electrical power to one or more resources, the plurality of power supply units including one or more online power supply units, one or more redundant power supply units, and one or more standby power supply units; and
a management controller communicatively coupled to the power supply units and configured to:
determine a power requirement of resources powered from the plurality of power supply units;
determine a power capacity of the one or more online power supply units;
determine if the power capacity of the one or more online power supply units exceeds the power requirement of the resources;

transition at least one of the power supply units, wherein the transition includes at least one of:
  a transition of at least one of the one or more online power supply units to a standby power supply unit in response to a determination that the power capacity of the one or more online power supply units exceeds the determined power requirement of the resources; and
  a transition of at least one of the one or more standby power supply units to an online power supply unit in response to a determination that the power requirement of the resources exceeds the determined power capacity of the one or more online power supply units;
determine if a redundancy policy for the plurality of power supply units will be satisfied in the event that at least one of the redundant power supply units is transitioned to a standby power supply unit; and
transition at least one of the one or more redundant power supply units to a standby power supply unit in response to a determination that the redundancy policy for the plurality of power supply units will be satisfied in the event that the at least one of the redundant power supply units is transitioned to a standby power supply unit.

8. A system according to 7, the management controller further configured to:
determine if a power capacity of the remaining online power supply units will exceed the power requirements of the resources in the event that at least one of the online power supply units is transitioned to a standby power supply unit; and
transition at least one of the one or more online power supply units to a standby power supply unit in response to a determination that the power capacity of the remaining online power supply units will exceed the determined power requirements of the resources in the event that the at least one of the online power supply units is transitioned to a standby power supply unit.

9. A system according to claim 7, wherein the redundancy policy is selected from the group consisting of N+N redundancy and N+1 redundancy.

10. A system according to claim 7, the management controller further configured to:
determine if one or more additional redundant power supply units are needed to satisfy a redundancy policy for the plurality of power supply units; and
transition at least one of the one or more standby power supply units to a redundant power supply unit in response to a determination one or more additional redundant power supply units are needed to satisfy a redundancy policy for the plurality of power supply units.

11. A system according to claim 10, wherein the redundancy policy is selected from the group consisting of N+N redundancy and N+1 redundancy.

12. A system according to claim 7, wherein the resources, the plurality of power supply units, and the management controller are integral to a chassis.

13. An information handling system comprising:
resources including:
  a processor; and
  a memory communicatively coupled to the processor;
a plurality of power supply units configured to provide electrical power to the resources, the plurality of power supply units including one or more online power supply units, one or more redundant power supply units, and one or more standby power supply units; and
a management controller communicatively coupled to the power supply units and the resources and configured to:
determine a power requirement of the resources;
determine a power capacity of the one or more online power supply units;
determine if the power capacity of the one or more online power supply units exceeds the power requirement of the resources;
transition at least one of the power supply units, wherein the transition includes at least one of:
  a transition of at least one of the one or more online power supply units to a standby power supply unit in response to a determination that the power capacity of the one or more online power supply units exceeds the determined power requirement of the resources; and
  a transition of at least one of the one or more standby power supply units to an online power supply unit in response to a determination that the power requirement of the resources exceeds the determined power capacity of the one or more online power supply units;
determine if a redundancy policy for the plurality of power supply units will be satisfied in the event that at least one of the redundant power supply units is transitioned to a standby power supply unit; and
transition at least one of the one or more redundant power supply units to a standby power supply unit in response to a determination that the redundancy policy for the plurality of power supply units will be satisfied in the event that the at least one of the redundant power supply units is transitioned to a standby power supply unit.

14. An information system according to claim 13, the management controller further configured to:
determine if a power capacity of the remaining online power supply units will exceed the power requirements of the resources in the event that at least one of the online power supply units is transitioned to a standby power supply unit; and
transition at least one of the one or more online power supply units to a standby power supply unit in response to a determination that the power capacity of the remaining online power supply units will exceed the determined power requirements of the resources in the event that the at least one of the online power supply units is transitioned to a standby power supply unit.

15. An information system according to claim 13, the management controller further configured to:
determine if one or more additional redundant power supply units are needed to satisfy a redundancy policy for the plurality of power supply units; and
transition at least one of the one or more standby power supply units to a redundant power supply unit in response to a determination one or more additional redundant power supply units are needed to satisfy a redundancy policy for the plurality of power supply units.

16. An information system according to claim 13, wherein the number of redundant power supply units is determined based on at least a redundancy policy selected from the group consisting of N+N redundancy and N+1 redundancy.

17. An information system according to claim 13, wherein the resources, the plurality of power supply units, and the management controller are integral to a chassis.

* * * * *